United States Patent
Kellström et al.

(10) Patent No.: US 6,227,711 B1
(45) Date of Patent: May 8, 2001

(54) ROLLER BEARING

(75) Inventors: Magnus Kellström, Partille; Jonas Kullin, Landvetter; Joacim Fogelström, Billdal, all of (SE)

(73) Assignee: Aktiebolag SKF, Gothenburg (SE)

( * ) Notice: Subject to any disclaimer, the term of this patent is extended or adjusted under 35 U.S.C. 154(b) by 0 days.

(21) Appl. No.: 09/403,492
(22) PCT Filed: Apr. 22, 1998
(86) PCT No.: PCT/SE98/00726
    § 371 Date: Jan. 6, 2000
    § 102(e) Date: Jan. 6, 2000
(87) PCT Pub. No.: WO98/48189
    PCT Pub. Date: Oct. 29, 1998

(30) Foreign Application Priority Data

Apr. 24, 1997 (SE) ..... 9701551

(51) Int. Cl.$^7$ ..... F16C 19/00
(52) U.S. Cl. ..... 384/450; 384/568
(58) Field of Search ..... 384/450, 568, 384/567, 565, 571

(56) References Cited

U.S. PATENT DOCUMENTS 3,910,656  10/1975  Price et al. .
4,802,775  2/1989  Takata .
5,752,775  5/1998  Tsutsui et al. .

FOREIGN PATENT DOCUMENTS 2129066  5/1984  (GB) .

*Primary Examiner*—Lenard A. Footland
(74) *Attorney, Agent, or Firm*—Burns, Doane, Swecker & Mathis, L.L.P.

(57) ABSTRACT

A roller bearing with symmetric barrel shaped rollers comprising an inner race (13), an outer race (14) and rollers (11), each of which rollers have at least one rounded end, and being of the bearing type where rollers and race tracks have longitudinal section profiles with substantially the same radius of curvature, whereby the rollers during normal operating conditions are axially moveable between the race tracks without hindrance from axial confinements at the race tracks for allowing relative misalignment and axial displaceability of the race tracks, wherein the end drop zone has a length (d1) which is lower than 5% of the length (1a) of the roller, and which commences where the bend of the curvature of the roller in axial direction exceeds the normal curvature of the roller by 0.1°, and where the end drop of the roller is otherwise determined by the following relations, $r/1a \geq 0.35$ for γ values up to 0.7°, and $r/1a$ is $\geq 0.2$ for γ values between 0.7° and 1.4°.

4 Claims, 3 Drawing Sheets

ROLLER BEARING

The present invention relates to a roller bearing with symmetrical barrel shaped rollers comprising an inner race, an outer race and rollers, each of which having at least one rounded end, and of the type where rollers and race tracks have longitudinal section profiles with substantially the same radius of curvature and which is bigger than the distance between the outer race track and the axis of the bearing, measured perpendicularly to the race track, whereby the rollers during normal operating conditions are axially moveable between the race tracks without hindrance from axial confinements at the race tracks for allowing relative misalignment and axial displaceability of the race tracks.

BACKGROUND OF THE INVENTION

The end of rollers in such a bearing normally consist of a chamfered section. There is normally a relatively sharp edge between the chamfered section and the rest of the roller. At roller bearings of this type with symmetrical, barrel shaped rollers and especially when used on a substantially vertical axis, as shown in FIG. 1, a roller in the unloaded zone might move outwards to an extent permitted by the internal radial clearance. The relatively sharp edge between the chamfered section and the rest of the roller is thus in contact with the raceways. As the rotation continues the roller is forced to regain its normal position, i.e. it is caused to move towards the centre. This causes problems relating to stresses, service life and lubricant film thickness. These problems can be solved in the way that the relatively sharp edge between the chamfered section and the rest of the roller is rounded according to certain criteria.

SE-C 8404813-1 shows a bearing of the type where rollers and race tracks have longitudinal section profiles with substantially the same radius of curvature and which radius is bigger than the distance between the outer race track and the axis of the bearing, measured perpendicularly to the race track, whereby the rollers during normal operating conditions are axially moveable between the race tracks without hindrance from axial confinements at the race tracks for allowing relative misalignment and axial displaceability of the race tracks. Such a bearing is especially susceptible to the problems referred to hereabove.

U.S. Pat. No. 4,802,775, discloses a roller bearing having rollers with rounded end portions. It comprises an inner race, an outer race and rollers arranged between these races. The roller has a predetermined relationship between a maximum diameter of each roller, length of each roller, and radius of curvature of a contact portion between a rolling surface of the roller and a chamfer portion of the roller. The predetermined relationship is presented below.

$$0.04\sqrt{(Dalr)} \leq Rk \leq 0.20\sqrt{(Dalr)}, \text{ where}$$

Rk, Da and lr denotes curvature radius, maximum diameter of the roller and length of the roller, respectively. In this bearing there will be a radius of curvature which is not big enough for ascertaining that the stresses will be so small that the problems mentioned above are avoided.

PURPOSE AND MOST ESSENTIAL FEATURES OF THE INVENTION

The purpose of the invention is to prevent operational problems relating to stresses, service life and lubricant film thickness in a roller bearing with symmetrical, barrel shaped rollers, and of the type referred to in the introduction of the description, particularly, but not only, when used on a substantially vertical axis. The rollers are provided with end drop zones, i.e. end portions in which the roller has a much smaller longitudinal curvature radius than the radius of curvature of the barrel shaped roller itself. This arrangement results in tangential contact, i.e. the roller is supported by the raceway along a line segment, which results in prevention of operational problems which occur if the contact between rollers and raceways is based on a single point instead of a line segment.

In order to achieve the purpose of the invention, the following characterising criteria for the rounded portion of the end of the roller to be used in a roller bearing of the kind referred to are given below.

1) The minimum radius of the rounded end portion, also known as minimum end drop radius, is also important since if it is too small then the contact stresses will be too high. Also, the lubricant film thickness should be of at least half the magnitude of the film thickness at the center of the roller.

2) The maximum length of the rounded end portion of the rollers, also known as maximum end drop length, is also important since unnecessary reduction of load carrying contact will be the result if this length is too long.

3) The minimum length of the rounded end portion of the rollers, also known as minimum end drop length, is of great importance since if this length is too short then the operational problems presented above will still be present due to too short tangential contact.

4) The end drop radius does not have to be constant.

DESCRIPTION OF THE DRAWINGS

The invention will be further described below referring to the appended drawings presenting preferred embodiments.

DESCRIPTION OF PREFERRED EMBODIMENTS

Figure 1:
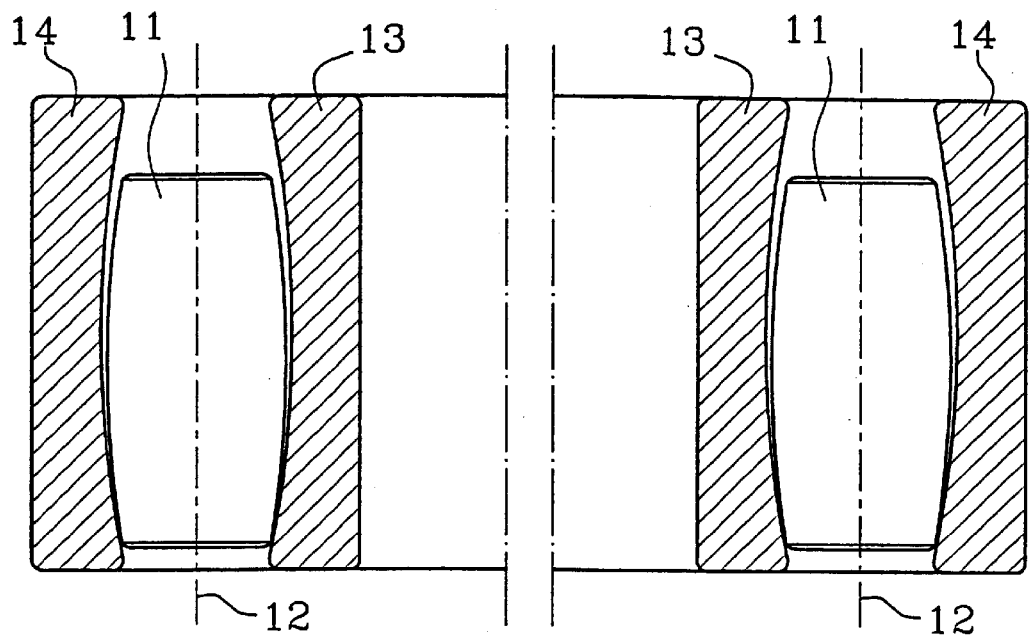
FIG. 1 shows a cross section through a conventional roller bearing having its axis arranged vertically and with the rollers in a "falling down" position.

FIG. 1 shows a roller bearing with symmetrical barrel shaped rollers. The bearing comprises an inner race 13, an outer race 14 and a plurality of rollers 11 disposed between the races. The bearing referred to is furthermore of the type having race tracks with a curvature radius much bigger than the radius between the longitudinal axis of the bearing and any point on said race track and the rollers have a curvature radius at least substantially corresponding to that of the race tracks. Furthermore, the rollers are not prevented from axial movement by flanges bordering the race tracks or the like. In this manner the bearing is capable of allowing misalignment and axial movement. This also means that the bearing of this type will be susceptible to the problems mentioned in the introduction of this application, particularly if the bearing is mounted on a substantially vertical axis as illustrated in this drawing figure.

Figure 3:
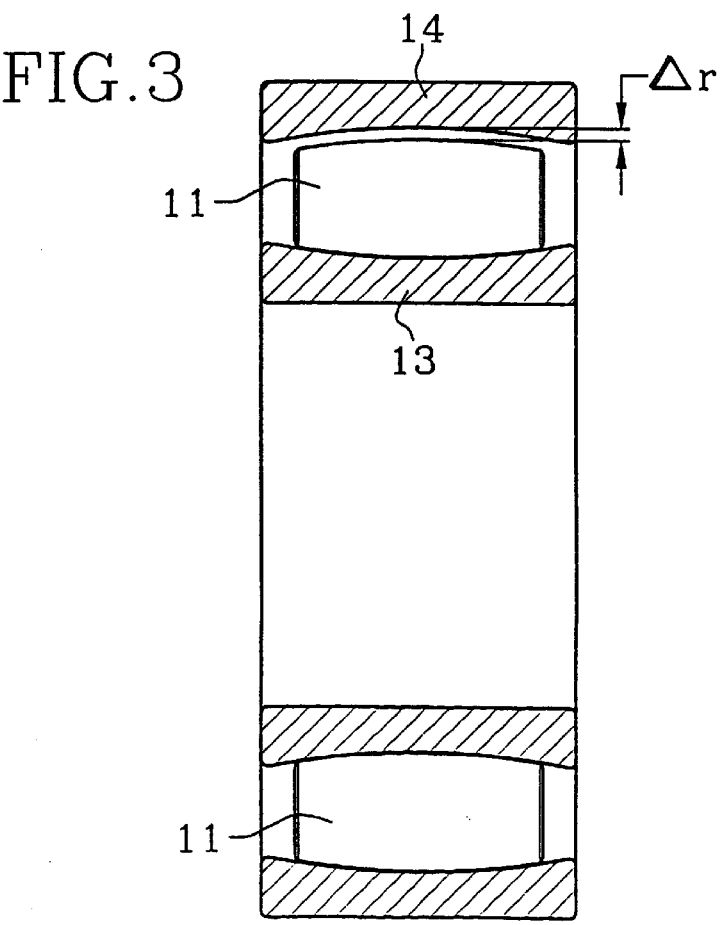
FIG. 3 is a cross sectional view of a bearing.
Figure 2:
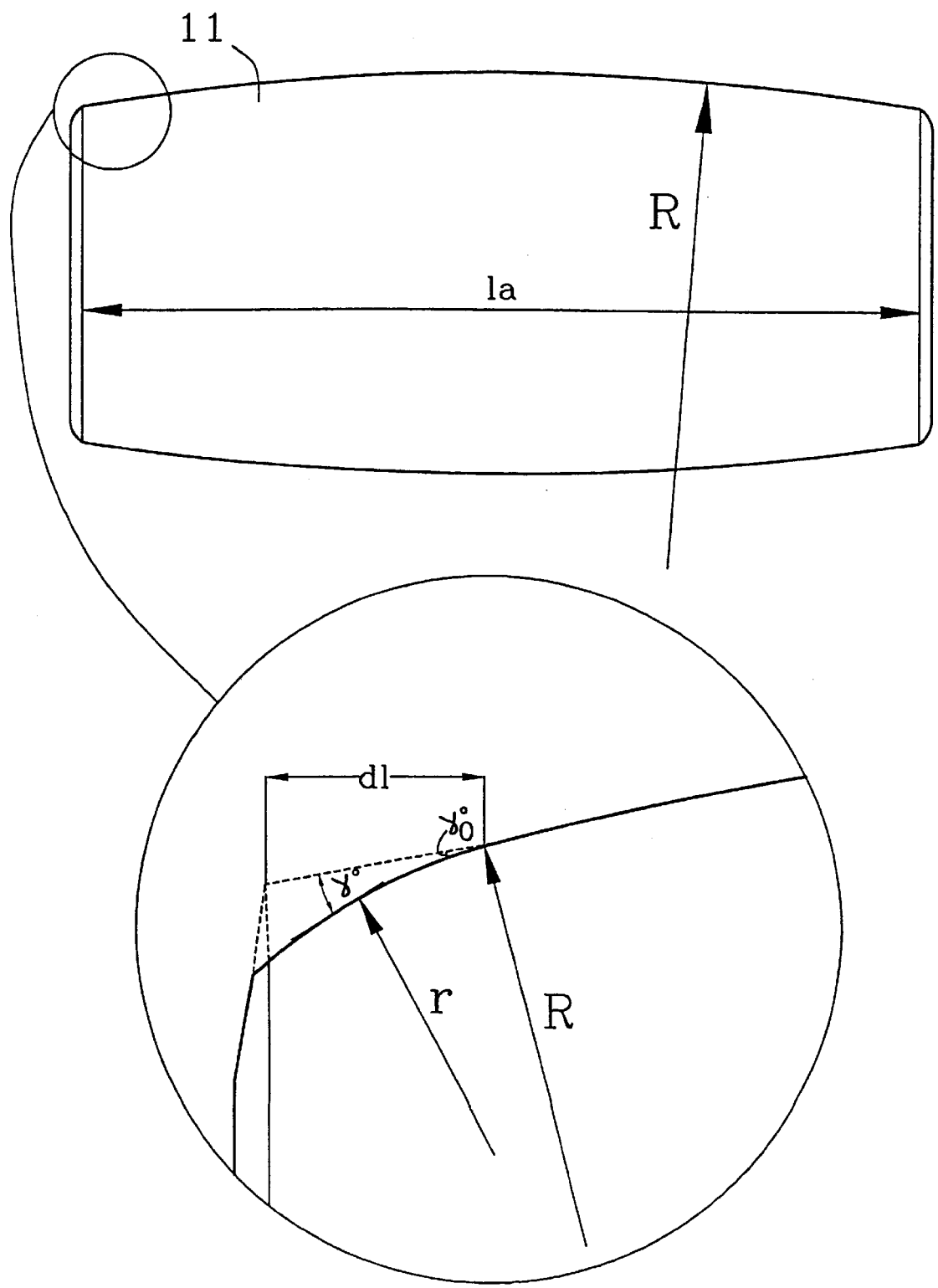
FIG. 2 is a view of a roller of a roller bearing. The figure also depicts an enlarged portion of the area of the roller where the rounded end portion is located.

FIG. 2 presents a preferred embodiment of the invention. It shows a roller to be used in a roller bearing with symmetrical barrel shaped rollers, of the bearing type referred to hereabove. At lest one end of the roller has an additional rounding bigger than the curvature of the roller itself, which is referred to as the end drop. The end drop extends over a zone, the end drop zone, having a length, d1, between the position where this additional rounding commences and the effective end of the roller. In the drawing, R denotes the longitudinal curvature radius of the roller, "r" is the radius of the rounding of the end drop zone, Δr is the internal radial clearance of the bearing, which is shown in FIG. 3. "1a", the effective length of said roller is defined in FIG. 2 as the axial length of the roller, which can be in contact with the raceways, and in which length the chamfered portions of the roller are normally not included.

Tangential contact between the roller and the raceways is preferred since this results in lower stresses. In order to obtain such tangential contact, the end drop geometry should be arranged in a manner further discussed and described herebelow.

It is no use making the end drop so long that there will be a gap, which is much larger than a typical elastic deflection in one roller to ring contact. If so, unnecessary reduction of load carrying contact would be the result. This leads to life reduction of the roller bearing. It has been shown that if the length of the end drop exceeds 5% of the effective roller length there will be more than a 25% reduction of raceway life. Longer end drop zones should therefore be avoided, and preferred is an end drop length in the order of 2% of the effective roller length, 1a, which gives a life reduction below 10%. In addition to the above, also the end drop radius should be discussed. The end drop radius, r, is the radius shown in FIG. 2. Based on stress considerations taking account of maximum speed and maximum load to which the bearing will be subjected, it is determined by the following relation, $r/1a \geq 0.35$, where 1a is the effective roller length. In addition to the above the end drop radius can also be based on the lubricant film thickness resulting in the following relation, $$r/1a \geq 0.2,$$

for r/Dw=0.5 and assuming an 1a of 2,5 Dw. Dw denotes the roller diameter.

Figure 4:
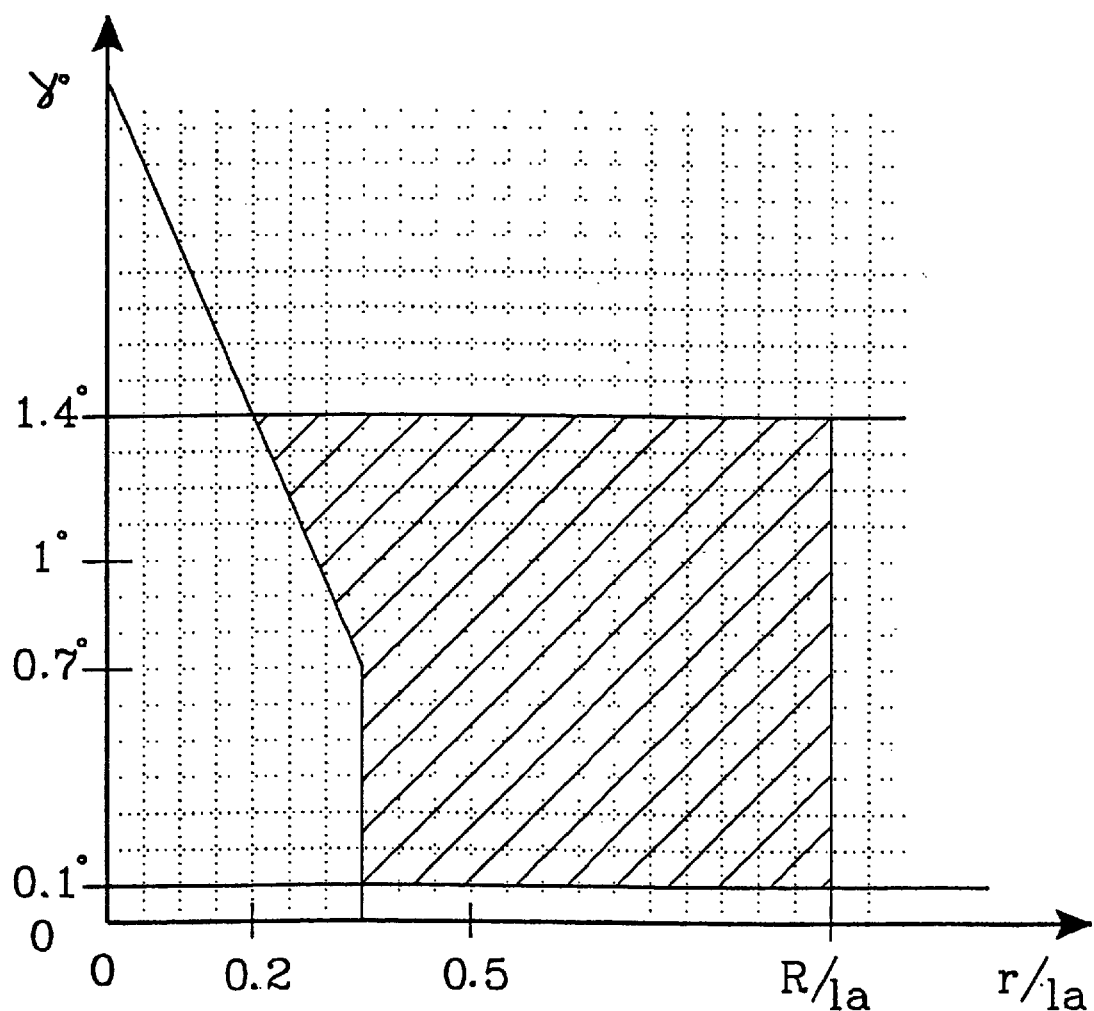
FIG. 4 is a diagram showing how the curvature of the rounded portion of the end drop zone can vary in accordance with the present invention.

FIG. 4 implies that the end drop radius r does not have to be constant along the end drop, but it can vary. The beginning and end of the end drop zone are defined through the angle γ of additional slope, as shown in FIG. 2. The end drop zone is between 0,1 and 1,4°.

The diagram in FIG. 4 shows an area within which the end drop radius can vary.

It should be noted that the scope of the invention is not limited to the embodiment shown in the drawings but the variation of the radius can be implemented in different ways.

For instance, the radius of the rounded feature of the roller can vary in the way that said radius is smaller at the end of the roller than the radius at the other end of the arc, i.e. on the curved side of the roller. The variation of the radius can also be implemented in a series of connected circular arcs, each of which may present a difference in radii. Also, this sequence of the circular arcs may present continuously decreasing radii.

What is claimed is:

1. A roller bearing having an axis and comprising an inner race defining an inner race track, an outer race defining an outer race track and symmetrical barrel shaped rollers disposed between said races, each of said rollers having at least one rounded end, said rollers and race tracks having longitudinal section profiles with substantially the same radius of curvature and which radius is greater than a distance between the outer race track and the axis of the bearing, measured perpendicularly to the race track, with the rollers during normal operating conditions being axially moveable between the race tracks without hindrance from axial confinements at the race tracks for allowing relative misalignment and axial displaceability of the race tracks, at least one of the rollers having an end drop that extends over a portion of the at least one roller defined as the end drop zone, said end drop zone having a length which is less than 5% of the length of the at least one roller, the end drop zone commencing where a bend of the curvature of the roller in an axial direction exceeds normal curvature of the roller by 0.1°, and the end drop of the roller being determined by the following relations:

$$r/1a \geq 0.35 \text{ for } \gamma \text{ values up to } 0.7°, \text{ and}$$

$$r/1a \geq 0.2 \text{ for } \gamma \text{ values between } 0.7° \text{ and } 1.4°$$

where r denotes the radius of the end portion rounding of said roller; 1a, the effective length of said roller; and γ is the angle of the end drop curvature in relation to the curvature of the roller itself.

2. A roller bearing as claimed in claim 1, wherein the radius of the end drop zone at a transition from the contact zone of the roller is lower than 2 times the length of the roller.

3. A roller bearing as claimed in claim 2, wherein the radius of the end drop zone gradually diminishes in a direction from the transition from the contact zone of the roller and towards an end of the roller.

4. A roller bearing as claimed in claim 1, wherein the radius of the end drop zone gradually diminishes in a direction from a transition from the contact zone of the roller and towards an end of the roller.

* * * * *